(12) United States Patent
Nohara et al.

(10) Patent No.: US 7,046,698 B1
(45) Date of Patent: May 16, 2006

(54) COMMUNICATING APPARATUS AND COMMUNICATING METHOD

(75) Inventors: Manabu Nohara, Tsurugashima (JP); Takehiko Shioda, Tsurugashima (JP); Katsunori Arakawa, Tsurugashima (JP); Osamu Yamazaki, Tsurugashima (JP); Masami Suzuki, Tsurugashima (JP); Yasuteru Kodama, Tsurugashima (JP); Masahiro Okamura, Tsurugashima (JP); Takayuki Akimoto, Tsurugashima (JP); Hiroto Inoue, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 535 days.

(21) Appl. No.: 09/658,877

(22) Filed: Sep. 8, 2000

(30) Foreign Application Priority Data

Sep. 10, 1999 (JP) .............................. P11-256961

(51) Int. Cl.
*H04J 3/06* (2006.01)

(52) U.S. Cl. ..................... 370/509; 370/514; 370/515
(58) Field of Classification Search ................ 370/310, 370/350, 511–515, 342, 503, 504, 509; 375/140–145
See application file for complete search history.

(56) References Cited

U.S. PATENT DOCUMENTS 6,381,264 B1 * 4/2002 Lomp et al. ................ 375/149
6,426,949 B1 * 7/2002 Zhou et al. .................. 370/342
6,526,039 B1 * 2/2003 Dahlman et al. ........... 370/350
6,567,461 B1 * 5/2003 Moon et al. ................ 375/145
6,647,405 B1 * 11/2003 Kuroiwa et al. ............ 708/700

FOREIGN PATENT DOCUMENTS

EP 0 825 737 A1 2/1998
EP 1 049 265 A2 11/2000

* cited by examiner

*Primary Examiner*—Ajit Patel
*Assistant Examiner*—Kevin Mew
(74) *Attorney, Agent, or Firm*—Drinker, Biddle & Reath LLP

(57) ABSTRACT

A communicating apparatus performs an asynchronous communication with a base station. The communicating apparatus is provided with: a receiving device for receiving a down link signal, which is transmitted from the base station and in which a division signal is inserted for each of constant time intervals; a detecting device for detecting division signals out of the received down link signal, in phase to the constant time intervals; an adding device for adding the detected division signals over a predetermined time duration, which is longer than the constant time interval, with matching phases for each of the constant time intervals, so as to generate accumulated additional values; and a memory device for storing the accumulated additional values generated by the adding device, to thereby perform synchronization capturing with the base station on the basis of the accumulated additional values added over the predetermined time duration and stored in the memory device.

4 Claims, 8 Drawing Sheets

MEMORY ADDRESS m

POINT (k=1~20)

COMMUNICATING APPARATUS AND COMMUNICATING METHOD

BACKGROUND OF THE INVENTION

1. Field of the Invention

The present invention relates to a communicating apparatus for and a communicating method of performing an asynchronous communication with a base station for example.

2. Description of the Related Art

As a communicating apparatus of this kind, there is a communicating apparatus using the CDMA (Code Division Multiple Access) method. For example, according to a movable body communicating system using the CDMA method on the business level, such a system structure is employed that a plurality of base stations are arranged for respective service areas, and that the asynchronous communication is performed between each base station and a communicating apparatus (i.e., a portable information terminal) carried by each user by means of wireless communication.

From the base station to the portable information terminal, a signal based on a format shown in FIG. 7 is transmitted for example. Namely, on the side of base station, a signal in which one wireless frame is constituted by 16 slots and a division signal called as a "long code mark symbol" to divide intervals of respective slots is inserted, is generated and transmitted. The portable information terminal receives a signal from the base station, detects a position of the long code mark symbol in the received signal, generates a base band signal by performing an inverse-spreading process by a predetermined spread code series signal synchronous with the long code mark symbol, and reproduces the data in each slot by decoding the base band signal.

In order that the portable information terminal performs the asynchronous communication by selecting one appropriate base station from among a plurality of base stations and decodes the data in each slot in the received signal at a best condition, it is important for the portable information terminal itself to accurately detect the position of the long code mark symbol within the received signal so as to match the generating timing of the spread code series signal with the base station side.

In order to detect the position of the long code mark symbol, a receiving circuit shown in FIG. 8 is equipped in the above mentioned portable information terminal, and a process to establish the synchronization (synchronization capture) between the base station side and the terminal information terminal side is performed in advance of the actual start of the communicating operation such as a voice communication, a data communication and so on.

In FIG. 8, the receiving circuit is provided with an antenna 1 for receiving an electric wave from a base station, and a slot search circuit 3 to which the signal received by the antenna is inputted through an RF (Radio Frequency) circuit 2. The slot search circuit 3 is provided with a matched filter 4, an adder 5, a memory unit 6 and a peak judging unit 7.

The matched filter 4 is a correlating device, performs a correlating calculation between a received signal Sin from the RF circuit 2 and the predetermined code series data (i.e., the data in the same series as the long code mark symbol), and detects the position of the long code mark symbol on the basis of a phase shift amount when the correlation value becomes the maximum.

More concretely, as shown in FIG. 7, by dividing one slot term by a time width $\tau$, which is one tenth of a chip duration Tc (=Tc/10), into 2560 points, the matched filter 4 performs the above mentioned correlating calculation, by using this time width $\tau$ as the phase shift amount, to thereby obtain the correlation value for every point i=1 to 2560 in the one slot term.

However, since the base station spreads the transmission signal to a wide band by a spectrum-spreading process, the S/N (Signal to Noise ratio) of the received signal is deteriorated at the portable information terminal, and the S/N of the correlation value is also deteriorated. Thus, it is generally difficult to accurately detect the position of the long code mark symbol on the basis of the correlation value obtained by the correlating calculation for just one slot term.

Therefore, the matched filter 4 repeats the correlating calculation for a plurality of slot terms (e.g., 32 slot terms), and the adder 5 adds and accumulates each calculated correlation value for each point i (i.e., for each phase shift amount) to thereby obtain the accumulated additional values each having a high S/N.

In order to obtain the accumulated additional value having the high S/N, 2560 memory areas AP(1) to AP(2560) are prepared to store the 2560 correlation values corresponding to the 2560 points in advance. When the matched filter 4 calculates the 2560 correlation values for each slot term, the adder 5 accumulates these newly calculated 2560 correlation values and the 2560 correlation values already stored in the memory unit 6 correspondingly for each point i (i.e., for each phase shift amount). Then, the matched filter 4 assigns and stores the 2560 accumulated correlation values again to the memory areas AP(1) to AP(2560). Then, by repeating those processes of the correlating calculation and the accumulation for a plurality of slot terms, a distribution of the accumulated additional value having the high S/N as shown in FIG. 9 is generated.

The peak judging unit 7 detects the greatest 20 accumulated additional values and the positions of the points i corresponding to those 20 accumulated additional values, from among the 2560 accumulated additional values, which have been accumulated over a plurality of slot terms and are finally stored in the memory areas AP (1) to AP(2560), to thereby generate a histogram as shown in FIG. 10. Further, on the basis of 20 points k in this histogram, the peak judging circuit 7 judges the position of the long code mark symbol in the received signal Sin, and establishes the synchronization (synchronization capture) to perform the asynchronous communication by selecting an appropriate base station. Then, by supplying this judgment result output to the spread series signal generator (not illustrated) equipped in the signal wave-detecting circuit, and by synchronizing the generation timing of the spread series signal to inverse-spread the received signal Sin with the position of the long code mark symbol, the base band signal decodable at the best condition is generated.

However, in the above mentioned portable information terminal, since a large amount of accumulated additional values i.e., the 2560 accumulated additional values are calculated, the memory unit 6 having a large memory capacity is equipped. Thus, there is a problem of an increase of the electric consumption, an increase of the cost and an increase of the apparatus size.

Especially, in order to accurately detect the position of the long code mark symbol by the above mentioned correlating calculation, it is desirable to improve the phase resolution of the correlation value by decreasing the time width $\tau$ (or the phase shift amount) as short as possible with respect to the chip duration Tc. However, as the time width $\tau$ is made the shorter, the total number of the points i in one slot term increases. Thus, there is such a problem that the memory unit 6 having an enormous memory capacity is necessary in accompaniment with the increase of the total number of the points i.

In case that the chip duration Tc with respect to a bit duration T i.e., a spreading ratio T/Tc is large, since the total number of the points i in one slot term increases, there is such a problem that the memory unit 6 having an enormous memory capacity is necessary in accompaniment with the increase of the total number of the points i.

SUMMARY OF THE INVENTION

It is therefore an object of the present invention to provide a communicating apparatus and a communicating method, which can perform synchronization capturing at a high accuracy by using a memory having a relatively small memory capacity.

The above object of the present invention can be achieved by a communicating apparatus for performing an asynchronous communication with a base station. The communicating apparatus is provided with: a receiving device for receiving a down link signal, which is transmitted from the base station and in which a division signal is inserted for each of constant time intervals; a detecting device for detecting division signals out of the received down link signal, in phase to the constant time intervals; an adding device for adding the detected division signals over a predetermined time duration, which is longer than the constant time interval, with matching phases for each of the constant time intervals, so as to generate accumulated additional values; and a memory device for storing the accumulated additional values generated by the adding device, to thereby perform synchronization capturing with the base station on the basis of the accumulated additional values added over the predetermined time duration and stored in the memory device.

According to the communicating apparatus of the present invention, the accumulated additional values are not generated for all of the received down link signal, but are generated just for the division signals in the received down link signal. Thus, the memory capacity of the memory device for storing the accumulated additional values can be drastically reduced.

In one aspect of the communicating apparatus of the present invention, the detecting device calculates a correlation between a signal correlated with the division signal and the received down link signal, and detects the division signal out of the received down link signal when the calculated correlation exceeds a predetermined threshold value.

According to this aspect, the timing when the calculated correlation exceeds the threshold value can be accurately detected as the position of the division signal included in the received down link signal. Then, by generating the accumulated additional signals just for the division signals each time the calculated correlation exceeds the threshold value, the memory capacity of the memory device for storing the accumulated additional values can be drastically reduced.

In another aspect of the communicating apparatus of the present invention, the memory device has a plurality of memory areas to store the accumulated additional values with packing each of the accumulated additional values in respective one of the memory areas, when the adding device generates the accumulated additional values by adding at different timings within the constant time interval.

According to this aspect, the respective accumulated additional values are not stored into different memory areas each time when each of the accumulated additional value is generated. Thus, the memory capacity of the memory device for storing the accumulated additional values can be drastically reduced.

The above object of the present invention can be also achieved by a communicating method of performing an asynchronous communication with a base station. The communicating method is provided with: a receiving process of receiving a down link signal, which is transmitted from the base station and in which a division signal is inserted for each of constant time intervals; a detecting process of detecting division signals out of the received down link signal, in phase to the constant time intervals; an adding process of adding the detected division signals over a predetermined time duration, which is longer than the constant time interval, with matching phases for each of the constant time intervals, so as to generate accumulated additional values; and a storing process of storing the accumulated additional values generated by the adding process into a memory device, to thereby perform synchronization capturing with the base station on the basis of the accumulated additional values added over the predetermined time duration and stored in the memory device.

According to the communicating method of the present invention, the accumulated additional values are not generated for all of the received down link signal, but are generated just for the division signals in the received down link signal. Thus, the memory capacity of the memory device can be drastically reduced.

In one aspect of the communicating method of the present invention, the detecting process calculates a correlation between a signal correlated with the division signal and the received down link signal, and detects the division signal out of the received down link signal when the calculated correlation exceeds a predetermined threshold value.

According to this aspect, the timing when the calculated correlation exceeds the threshold value can be accurately detected as the position of the division signal included in the received down link signal. Then, by generating the accumulated additional signals just for the division signals each time the calculated correlation exceeds the threshold value, the memory capacity of the memory device can be drastically reduced.

In another aspect of the communicating method of the present invention, the memory device has a plurality of memory areas, and the storing process stores the accumulated additional values with packing each of the accumulated additional values in respective one of the memory areas, when the adding process generates the accumulated additional values by adding at different timings within the constant time interval.

According to this aspect, the respective accumulated additional values are not stored into different memory areas each time when each of the accumulated additional value is generated. Thus, the memory capacity of the memory device can be drastically reduced.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

Figure 1:
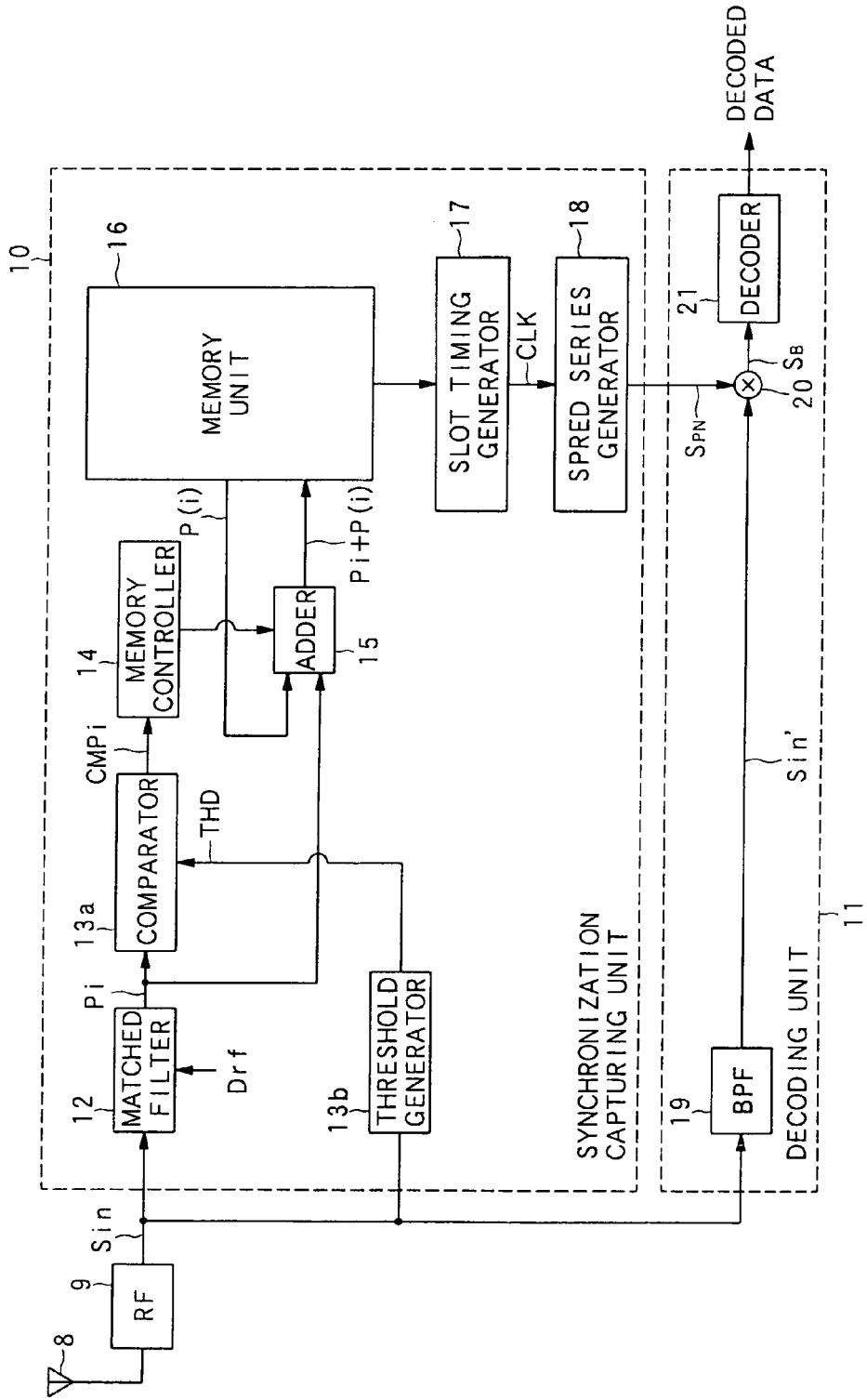
FIG. 1 is a block diagram showing a structure of a portable information terminal as an embodiment of the present invention.

Referring to the accompanying drawings, an embodiment of the present invention will be now explained. In the present embodiment, the present invention is applied to a portable information terminal using the CDMA communication method. FIG. 1 is a block diagram showing a structure of a portable information terminal as an embodiment of the communication apparatus of the present invention.

In FIG. 1, the portable information terminal is provided with an antenna 8 for performing a communication with a base station, an RF circuit 9 for amplifying a received signal which is received by the antenna and outputting it, a synchronization capturing unit 10 and a decoding unit 11. To each of the synchronization capturing unit 10 and the decoding unit 11, the received signal Sin from the RF circuit 9 is inputted.

The synchronization capturing unit 10 is provided with a matched filter 12, a comparator 13a, a threshold generator 13b, a memory controller 14, an adder 15, a memory unit 16, a slot timing generator 17 and a spread series generator 18.

The decoding unit 11 is provided with a band pass filter (BPF) 19, a multiplier 20 and a decoder 21.

The matched filter 12 is a correlating device for performing a correlating calculation promptly when the received signal Sin is inputted thereto in synchronization with the time width τ as described later, and may comprise a SAW (Surface Acoustic Wave) element, a CCD (Charged Coupled Device) and the like. More concretely, an elastic type SAW convolver device is employed here as the correlating device, in which the tap number is set to 256. The matched filter 12 performs a mutual correlating calculation between the received signal Sin and the predetermined code series data Drf, and outputs a correlation value Pi, which is a result of the correlating calculation, to the comparator 13a and the adder 15.

Figure 7:
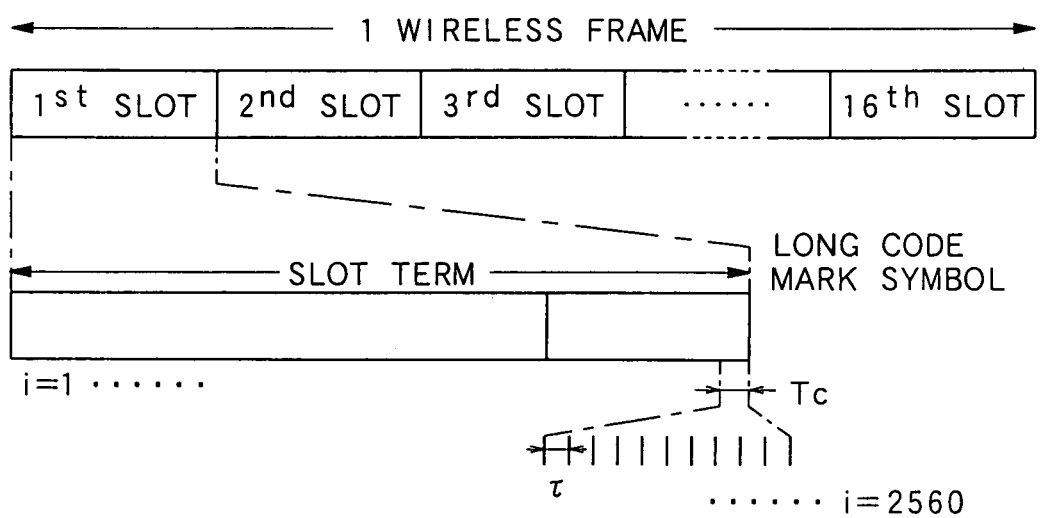
FIG. 7 is a diagram showing formats of a signal transmitted from a base station and a received signal.

For the sake of the explanation, it is assumed here that the signal from the base station is based on the format shown in FIG. 7 i.e., one wireless frame has 16 slots and the long code mark symbol, which is a dividing signal to divide the respective slot intervals, is inserted. Thus, the received signal Sin outputted from the RF circuit 9 is also based on the format shown in FIG. 7.

On the other hand, the code series data Drf is set in advance to the matched filter 12. The code series data Drf is a code series, whose correlation with the long code mark symbol or the code series same as the long code mark symbol is high.

In the same manner as shown in FIG. 7, one slot term of the received signal Sin is divided by a time width τ, which is one tenth of a chip duration Tc (=Tc/10), into 2560 points. Further, the matched filter 12 performs the above mentioned correlating calculation, by using this time width τ as the phase shift amount, to thereby obtain the correlation values P1 to P2560 for the 2560 points in the one slot term.

Therefore, the matched filter 12 performs the correlating calculation collectively for the code series data Drf and the received signal Sin in the amount of the 256 taps, and further performs the above mentioned correlating calculation while the received signal Sin is being inputted (or being phase-shifted) in synchronization with the time width τ, to thereby output the maximum correlation value at the time when the phase of the code series data Drf and the long code mark symbol in the received signal Sin are coincident with each other. This maximum correlation value is equivalent to the long code mark symbol.

The matched filter 12 performs the correlating calculation over a plurality of slot terms (e.g. 32 slot terms). Namely, the matched filter 12 performs the correlating calculation 32 times repeatedly so as to obtain the correlation values P1 to P2560 in the amount of 60 points per one slot term.

The comparator 13a compares each correlation value Pi (i corresponds to any point of the points 1 to 2560) which is outputted sequentially from the matched filter 12 in synchronization with the time width τ, with the threshold value THD, and outputs a comparison signal CMPi, which becomes a logical "1" if Pi≧THD and a logical "0" if Pi<THD. Namely, the comparator 13a constitutes a detecting device for detecting the long code mark symbol included in the received signal Sin in cooperation with the matched filter 12.

The threshold generator 13b integrates the received signal Sin for a predetermined time duration and multiplies a time average of the integrated value with a proportional coefficient α to thereby generate the threshold value THD.

The proportional coefficient α is a fixed value determined by an experiment etc., to automatically generate the threshold value THD such that, in the correlating calculation, the correlation value Pi, which is generated when the phases of the long code mark symbol in the received signal Sin and the code series data Drf are approximately coincident with each other, is greater than the threshold value THD and the correlation value Pi, which is generated when the phases of the long code mark symbol in the received signal Sin and the code series data Drf are drastically offset to each other, is smaller than the threshold value THD.

The memory controller 14 controls the adder 15 and the memory unit 16 in accordance with the logical value of the comparison signal CMPi. When the comparison signal CMPi is the logical "1", the memory controller 14 controls the newest correlation value Pi calculated by the matched filter 12 at the moment to be inputted to the adder 15, and. The memory controller 14 accesses the memory unit 16 to read out the accumulated additional value P(i) corresponding to the point (phase shift amount) i of the correlation value Pi and supplies it to the adder 15. The memory controller 15 controls the adder 15 to perform the adding calculation of the accumulated additional value P(i) and the correlation value Pi.

When the adder 15 outputs the additional value "Pi+P(i)" after adding the correlation value Pi and the accumulated additional value P(i), the memory controller 14 accesses the memory unit 16 again at the memory area where the accumulated additional value P(i) is stored, and stores the additional value "Pi+P(i)" as the new accumulated additional value P(i) into the memory area (the same memory area).

On the other hand, when the comparison signal CMPi is the logical "0", the control for the above mentioned adding calculation is stopped.

Therefore, only in case that the comparison signal CMPi is the logical "1", the memory controller 14 controls the adder 15 to perform the adding calculation of the accumulated additional value P(i) and the correlation value Pi corresponding to the point i, and stores the additional value Pi+P(i) into the memory unit 16 again. Thus, only the additional value Pi+P(i) of the correlation value Pi which is greater than the threshold value THD is stored into the memory unit 16 as the new accumulated additional value P(i).

Further, since the above correlating calculation is performed by the matched filter 12 over the 32 frame terms, the accumulated additional value of the correlation value Pi which is greater than the THD is stored as the new accumulated additional value P(i) in association with the point (phase shift amount) i into the memory unit 16.

In case that the accumulated additional value P(i) corresponding to the point (phase shift amount) i of the correlation value Pi, which is judged to be greater than the threshold value THD, is not stored in any memory area of the memory unit 16, i.e., in case that the correlation value Pi is firstly generated at a certain point (phase shift amount) i, the memory controller 14 reserves a new memory area to store this correlation value Pi in the memory unit 16, and actually stores this correlation value Pi into the new memory area as it is.

Figure 2:
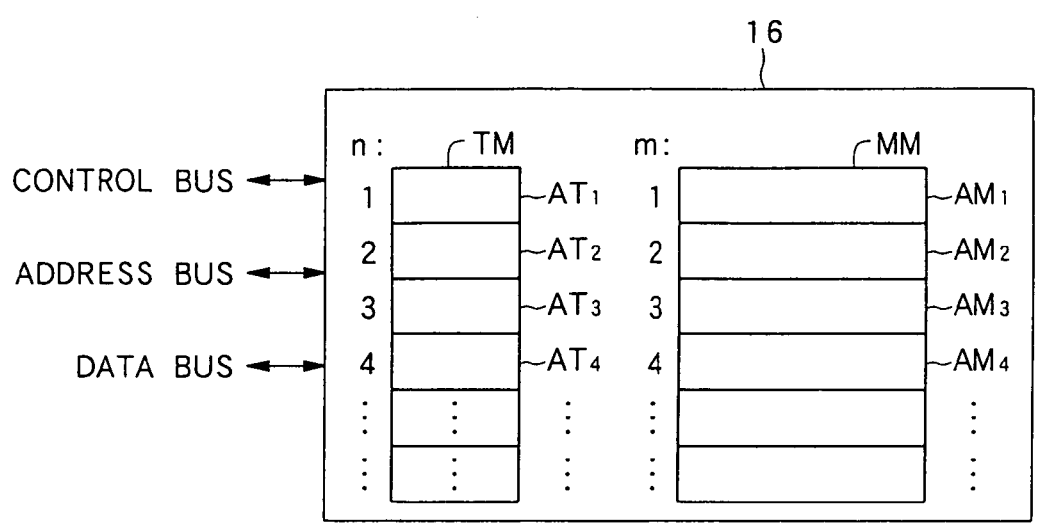
FIG. 2 is a diagram showing a structure of a main memory unit and a temporary memory unit in the embodiment.

The memory unit 16 is constituted to store the accumulated additional value P(i) in association with the point (phase shift amount) i and has a temporary memory unit TM and a main memory unit MM as shown in FIG. 2.

The temporary memory unit TM and the main memory unit MM are connected to the memory controller 14, the adder 15 and the slot timing generator 17 through a control bus, an address bus and a data bus.

The main memory unit MM has a plurality of memory areas AM1, AM2, AM3, . . . , which are assigned by memory addresses m=1, 2, 3, . . . , and stores a plurality of accumulated additional values P(i) into the memory areas AM1, AM2, AM3, . . . , respectively for each point i, according to an instruction of the memory controller 14.

The temporary memory unit TM has a plurality of memory areas AT1, AT2, AT3, . . . , which are assigned by memory addresses n=1, 2, 3, . . . , and stores the point i of the accumulated additional value P(i) stored in the main memory MM as well as index data D (i, m) to indicate the address m of the memory area where the accumulated additional value P(i) is stored, according to an instruction of the memory controller 14.

The main memory unit MM and the temporary memory unit TM do not have the memory capacity to store all the accumulated additional values corresponding to all the points (all the phase shift amount) i=1 to 2560 as in the case of the related art.

Figure 8:
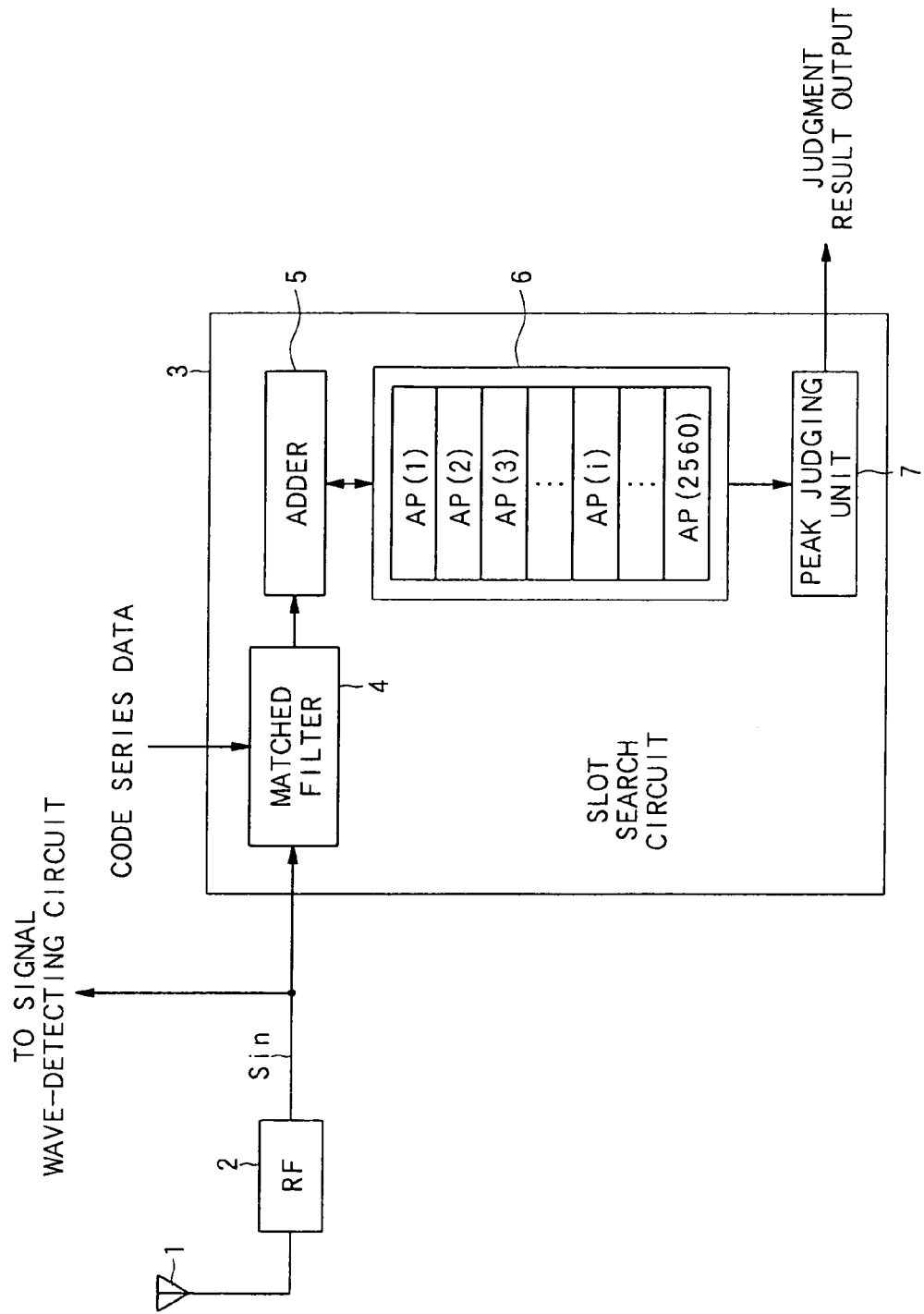
FIG. 8 is a block diagram showing a structure of a portable information terminal according to a related art.
Figure 9:
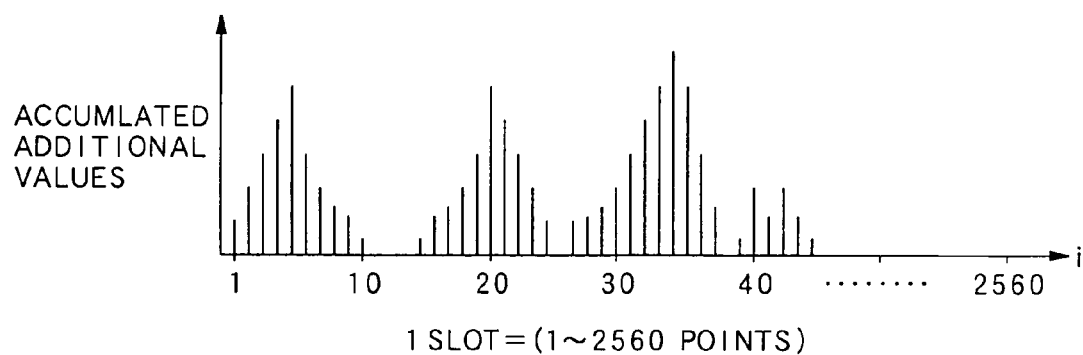
FIG. 9 is a graph showing the accumulated additional values finally stored in the memory unit in the portable information terminal of the related art.
Figure 10:
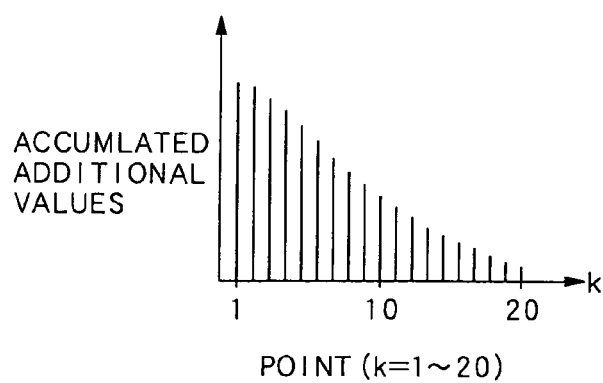
FIG. 10 is a histogram generated on the basis of the greatest 20 accumulated additional values among the accumulated additional values finally stored in the memory unit in the portable information terminal of the related art.

More concretely, the memory unit 6 according to the related art shown in FIG. 8 stores all the accumulated additional values for 2560 points. Thus, the 2560 memory areas AP(1) to AP(2560) are prepared in advance. In contrast to this, according to the present embodiment, since the synchronization capture can be performed on the basis of the less number of the accumulated additional values, the total memory capacity of the main memory MM and the temporary memory unit TM is much less than that of the memory unit 6 in the related art.

Incidentally, the feature that the highly accurate synchronization capture can be established, even if the total memory capacity of the main memory unit MM and the temporary memory unit TM is much less than that of the related art, will be explained later together with the operation.

Next, the memory controller 14, the temporary memory unit TM and the main memory unit MM are explained with reference to FIGS. 3A to 3B.

Figure 3A:
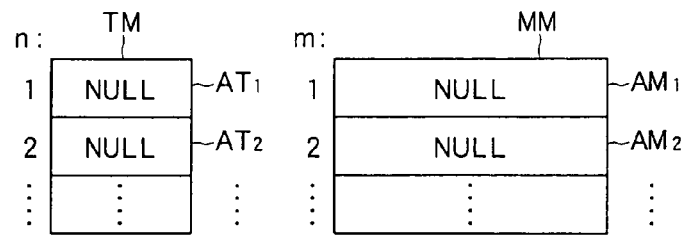
FIG. 3A is a diagram for explaining functions of the main memory unit and the temporary memory unit as well as a memory controller in one condition in the embodiment.

As shown in FIG. 3A, meaningless data (NULL data) are stored in the temporary memory unit TM and the main memory unit MM before the matched filter 12 starts the correlating calculation.

In this condition, when the matched filter 12 starts the correlating calculation and if the correlation value P50 which is greater than the threshold value THD at the point i=50 in the first slot term for example, the memory controller 14 access the temporary memory unit TM to check whether or not the index data D (i, m) indicative of the point i=50 is already stored therein.

In this case, since the NULL data is stored in the temporary memory unit TM as mentioned above, the memory controller 14 judges that the index data D (i, m) is not stored yet.

Figure 3B:
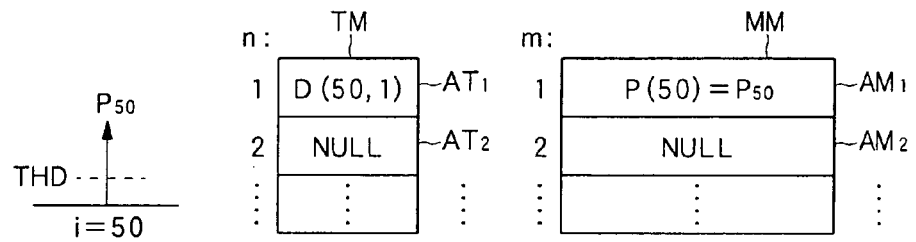
FIG. 3B is a diagram for explaining functions of the main memory unit and the temporary memory unit as well as a memory controller in another condition in the embodiment.

Then, as shown in FIG. 3B, the memory controller 14 stores the correlation value P50 as the accumulated additional value P(50) into the memory area AM1 of the main memory unit MM at the first address m=1, and further stores the index data D (50, 1) into the memory area AT1 of the temporary memory unit TM at the first address n=1. As a result, the accumulated additional value P (50)=P50 is stored in the main memory unit MM in association with the index data D (50, 1) stored in the temporary memory unit TM.

Consecutively, the correlating calculation is performed. Assuming that the correlation value P50 which is greater than the threshold value THD is calculated at the point i=50 in the second slot term for example, the memory controller 14 accesses the temporary memory unit TM to check the index data D (i, m) indicative of the point i=50 is already stored therein.

In this case, as shown in FIG. 3B, since the index data D (50, 1) is stored, the memory controller 14 judges that the index data D (i, m) indicative of the point i=50 is stored. Further, the memory controller 14 obtains the address m=1 from the index data D (50, 1), and reads out the accumulated additional value P (50) stored in the memory area AM1 of the main memory unit MM at the address m=1 and supplies it to the adder 15.

Figure 3C:
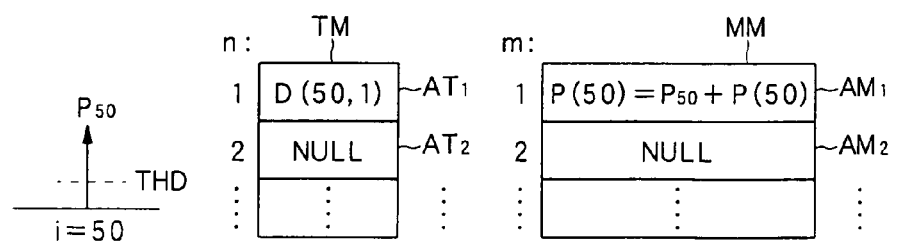
FIG. 3C is a diagram for explaining functions of the main memory unit and the temporary memory unit as well as a memory controller in another condition in the embodiment.

When the adder 15 adds the accumulated additional value P (50) and the correlation value P50 from the matched filter 12 together, the memory controller 14 again accesses the memory area AM1 of the main memory unit MM at the address m=1 to store the additional value P50+P (50) as a new accumulated additional value P (50) to the same memory area AM 1 as shown in FIG. 3C. Further, since the index data D (50, 1) is already stored in the temporary memory unit TM, the memory controller 14 does not store the index data (50, 1) into any other memory area but maintains it as it is in the memory area AM1 at the address n=1.

Figure 3D:
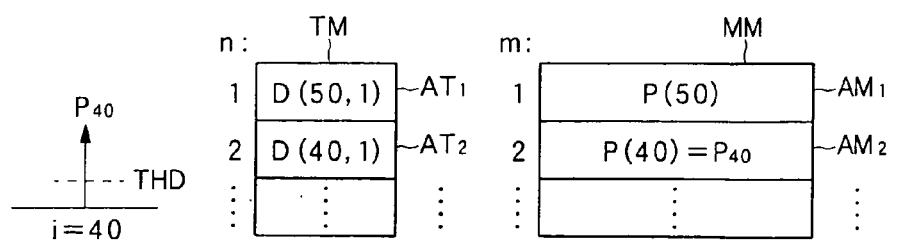
FIG. 3D is a diagram for explaining functions of the main memory unit and the temporary memory unit as well as a memory controller in another condition in the embodiment.

Assuming that the correlation value P40 which is greater than the threshold value THD is calculated at the point i=40 for example in place of the pint i=50 in the second slot term, as shown in FIG. 3D, the correlation value P40 is stored as the accumulated additional value P (40) into the memory area AM2 o the main memory unit MM at the address m=2, and further the index data D (40, 2) is stored into the memory area AT2 of the temporary memory TM at the address n=2. As a result, the accumulated additional value P (40)=P40 is stored into the main memory unit MM in association with the index data D (40, 2) stored in the temporary memory unit TM. Furthermore, the index data D (40, 2) and the accumulated additional value P (40) are packed and stored into the temporary memory unit TM and the main memory unit MM respectively.

In this manner, the accumulated additional values P (i) in the amount of 32 slot terms are stored into the main memory units MM, while the index data D (i, m) indicative of the memory address m and the point i of the accumulated additional values P (i) stored in the main memory unit MM are stored into the temporary memory TM.

Figure 4:
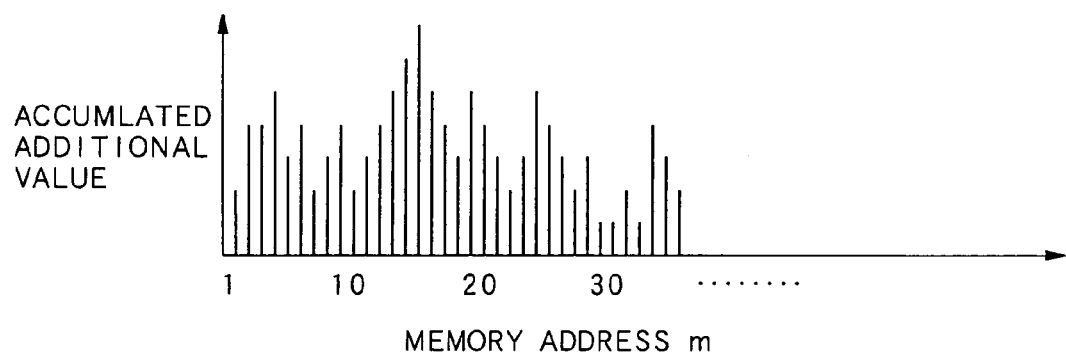
FIG. 4 is a graph showing the accumulated additional values finally stored in the main memory unit in the embodiment.

Furthermore, since each accumulated additional value P (i) in the amount of 32 slot terms is accumulated by selecting only the correlation values Pi greater than the threshold value THD, the total number of the accumulated additional values P(i) is drastically less than the total number of the points i (e.g., 2560 points). Also, each accumulated additional value P(i) is packed and stored in the main memory unit MM in the younger order of the address m as shown in FIG. 4. As a result, the temporary memory unit TM and the main memory unit MM can store all the accumulated additional values P(i) by using the memory capacity much less than that of the memory unit 6 of the related art (refer to FIG. 8)).

Figure 5:
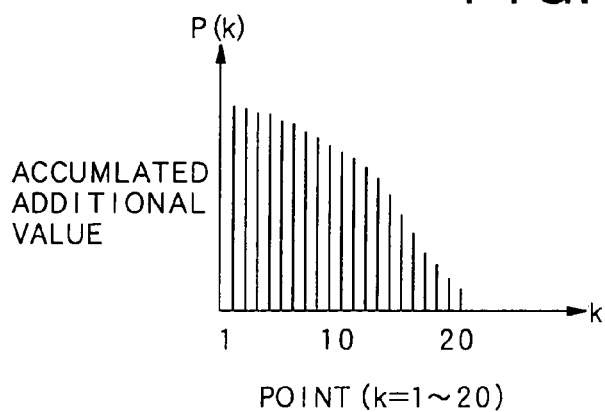
FIG. 5 is a histogram generated on the basis of the greatest 20 accumulated additional values among the accumulated additional values finally stored in the main memory unit in the embodiment.

The slot timing generator 17 extracts the greatest 20 accumulated additional values among all the accumulated additional values in the amount of 32 slot terms which are finally stored in the main memory unit MM. Further, the slot timing generator 17 extracts the position of each point i corresponding respective one of the greatest 20 accumulated additional values from the index data D (i, m) stored in the temporary memory unit TM. Then, a histogram as shown in FIG. 5 is generated by arranging the greatest 20 accumulated additional values in the greater order. Furthermore, the position of the long code mark symbol in the received signal Sin is judged on the basis of the 20 points k in the histogram, and supplies the slot timing signal CLK synchronous with the position of the long code mark symbol to the spread series generator 18.

The spread series generator 18 generates the spread series signal SPN for inverse-spreading, in synchronization with the slot timing signal CLK and supplies it to the multiplier 20 in the decoding circuit 11.

The band pass filter 19 passes the signal component Sin' having the frequency of the downstream communication line among the received signal Sin and supplies it to the multiplier 20.

The multiplier 20 generates the base band signal SB by multiplying the signal component Sin' and the spread series signal SPN, and decodes the data in each frame by supplying the base band signal SB to the decoder 21.

Figure 6:
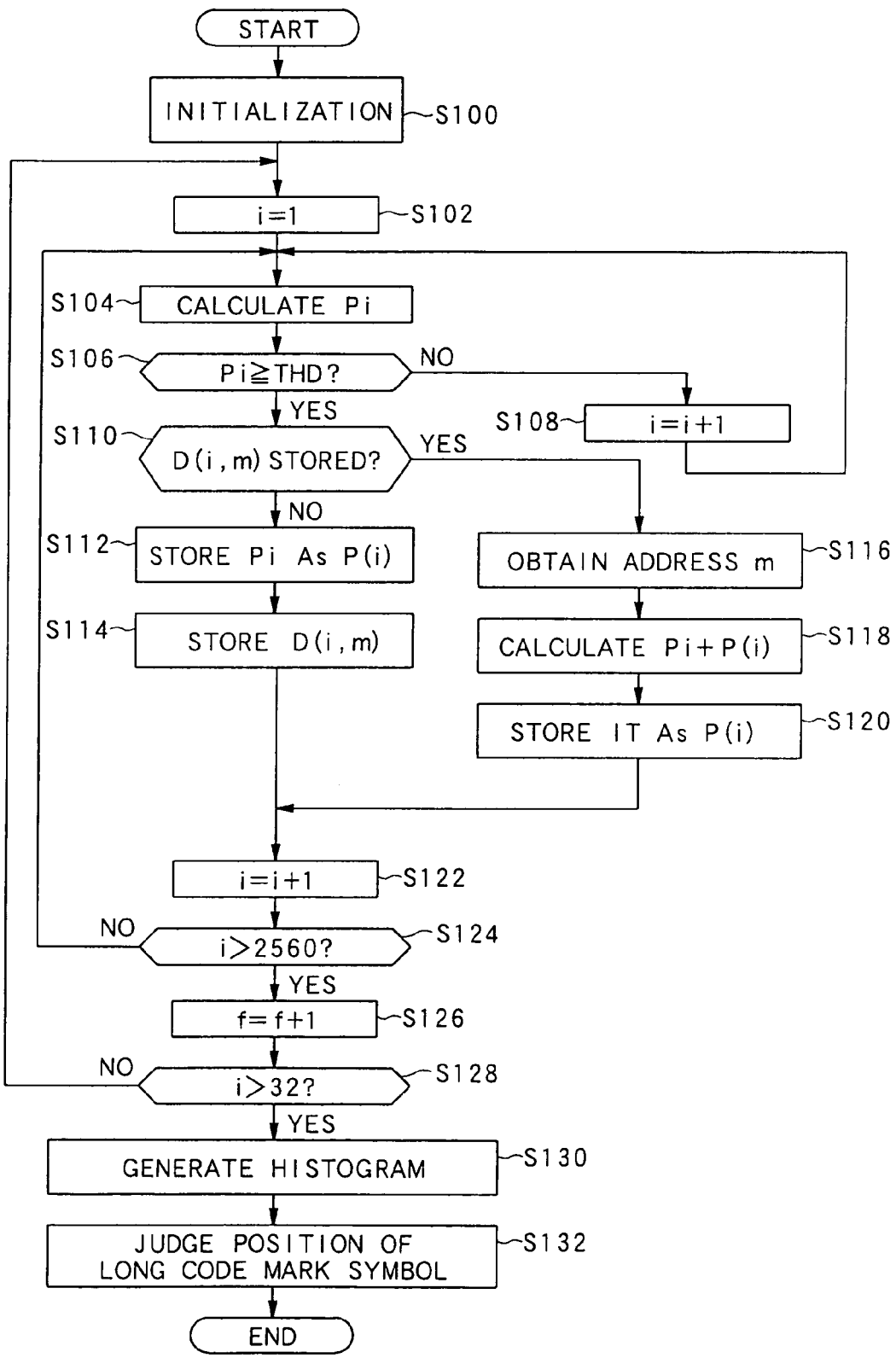
FIG. 6 is a flow chart showing an operation of the portable information terminal of the embodiment.

Next, one example of the operation of the portable information terminal of the present embodiment having the above described structure is explained with reference to a flow chart shown in FIG. 6.

When the electric power of the portable information terminal is turned on, the receiving process is started, and an initialization process is performed (step S100). In this initialization process, the received signal Sin is integrated for the predetermined time duration by the threshold generator 13b, and the time average of the integrated value is multiplied with the proportional coefficient $\alpha$, so that the threshold value THD is determined. Further, the memory controller 14 clears up the temporary memory unit TM and the main memory unit MM, to store the NULL data to them. Furthermore, the memory addresses of the temporary memory unit TM and the main memory unit MM are set as n=1 and m=1 respectively, and the value of a slot counter f built in the memory controller 14 is set to "1". This slot counter f is prepared for counting the order of the slot term for which the correlating calculation is performed.

Next, the value of a point counter i built in the memory controller 14 is set to "1" (step S102). This point counter i is prepared for counting the order of the point (phase shift amount) i of the correlation value Pi.

Then, the correlation value Pi is calculated by the matched filter 12 (step S104), and the calculated correlation value Pi and the threshold value THD are compared with each other by the comparator 13a (step S106).

Then, if Pi<THD (step S6: NO), the operational flow branches to a step S108, where the value of the point counter i is incremented and the correlating calculation from the step S104 is repeated. On the other hand, if Pi≧THD (step S106: YES), the operational flow proceeds to a step S110. Therefore, the correlation value Pi less than the threshold value THD is abandoned while the process at the step S110 is performed only if the correlation value Pi greater than the threshold value THD is calculated at the step S104.

Then, the temporary memory unit TM is examined, and it is judged whether or not the index data D (i, m) corresponding to the value of the point counter i is stored in the temporary memory unit TM (step S110). Here, if the index data D (i, m) corresponding to the value of the point counter i is not stored (step S110: NO), it is judged that the correlation value Pi is firstly calculated at the point i, and the operational flow proceeds to a step S112, where the correlation value Pi is stored as the accumulated additional value P(i) into the memory area of the main memory unit MM at the memory address m (step S112). Further, the index data D (i, m) is stored into the memory area of the temporary memory unit TM at the memory address n (step S114). Then, the operational flow proceeds to a step S122.

On the other hand, at the step S110, if the index data D(i, m) corresponding to the value of the point counter i is stored (step S110: YES), the operational flow branches to a step S116, where the data at the memory address m corresponding to the point i is obtained from the index data D (i, m). Then, the memory controller 14 accesses the memory area at the address m of the main memory unit MM to read out the accumulated additional value P(i) which has been already stored therein, and calculates the additional value Pi+P(i) (step S118). Then, this calculated additional value Pi+P(i) is stored as the new accumulated additional value P(i) into the memory area at the same address m (step S120). Then, the operational flow proceeds to a step S122.

Then, the value of the point counter i is incremented (step S122), and it is judged whether or not the value of the pointer counter i exceeds 2560 (step S124). If i>2560 (step S124: YES), the operational flow proceeds to a step S126. On the other hand, if i≦2560 (step S124: NO), the processes from the step S104 to the step S124 are repeated. Therefore, until the value of the point counter i reaches 2560, the processes from the step S104 to the step S124 are repeated, so that the correlating calculations for 2560 points are repeated over one slot term, and further the accumulated additional values P(i) of the correlation values Pi which satisfy Pi≧THD are stored in the main memory unit MM in association with the point i.

At the step S124, if i>2560 (step S124: YES), it is judged that the correlating calculations for one slot term have been completed. Then, the value of the slot counter f is incremented (step S126), and it is judged whether or not the value of the slot counter f exceeds 32 (step S128). If if f≦32 (step S128: NO), the processes from the step S102 to the step S128 are repeated. Therefore, the correlating calculations are repeated for 32 slot terms, and the accumulated additional values P(i) of the correlation values Pi which satisfy Pi≧THD are stored into the main memory unit MM in association with the point i.

In this manner, the correlating calculations for 32 slot terms are repeated, and when it becomes as f>32 at the step S128 (step S128: YES), it is judged that the accumulated additional values for 32 slot terms as shown in FIG. 4 are stored in the main memory unit MM, and the operational flow proceeds to a step S130.

Then, the slot timing generator 17 extracts the greatest 20 accumulated additional values from among all the accumulated additional values for 32 slot terms finally stored in the main memory unit MM. Further, by extracting the position of each point i corresponding to respective one of those greatest 20 accumulated additional values from the index data D (i, m) stored in the temporary memory unit TM, the slot timing generator 17 generates the histogram as shown in FIG. 5 (step S130).

Then, the slot timing generator 17 judges the position of the long code mark symbol in the received signal Sin on the basis of the 20 points within this histogram, and supplies the slot timing signal CLK synchronous with the position of the long code mark symbol to the spread series generator 18 (S132).

By the processes described above, the synchronous capture to detect the position of the long code mark symbol in the received signal Sin is completed. Then, the spread series generator 18 generates the spread series signal SPN for inverse-spreading, in synchronization with the slot timing signal CLK, and supplies it to the multiplier 20 in the decoding circuit 11, so that the base band signal SB decodable at the best condition can be generated.

In this manner, according to the present embodiment, since each accumulated additional value P(i) is calculated by extracting only the correlation value Pi greater than the threshold value THD, and is packed and stored into the main memory unit MM in association with each point i, it is possible to reduce the memory capacity of the memory unit 16.

In the above described embodiment, the correlating calculations are repeated over 32 slot terms. However, the present invention is not limited to the 32 slot terms. For example, it is possible to repeat the correlating calculations over appropriate slot terms.

In the above described embodiment, the case has been explained in which the present invention is applied to the CDMA method using the DS (Direct Sequence) method. However, the present invention is not limited to this method. For example, it is possible to apply the present invention to the CDMA method using FH (Frequency Hopping) method.

Further, although in the above described embodiment, the case has been explained in which the present invention is applied to the CDMA method, it is possible to apply the present invention to the FDMA method, the TDMA method and so forth.

Furthermore, although in the above described embodiment, the case has been explained in which the present invention is applied to the wireless type portable information terminal, it is possible to apply the present invention to any kind of communication technique regardless of the wireless or wire communication. For example, the present invention can be applied to an optical LAN (Local Area Network) in which an optical fiber is used as a communication path, a wireless LAN in which the communication is performed by transmitting an optical signal in the air, and so forth.

The present invention can be applied to either one of the digital communication and the analog communication. In the present embodiment, although the case has been explained in which the signal is modulated by the PSK (Phase Shift Keying) method and is received, it is possible to apply the present invention to other types of the modulating methods, such as the ASK (Amplitude Shift Keying) method, the OOK (On-Off Shift Keying) method, the FSK (Frequency Shift Keying) and so forth.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-256961 filed on Sep. 10, 1999 including the specification, claims, drawings and summary is incorporated herein by reference in its entirety.

What is claimed is:

1. A communicating apparatus for performing an asynchronous communication with a base station, comprising:
a receiving device for receiving a down link signal, which is transmitted from the base station and in which a division signal is inserted for each of constant time intervals;
a detecting device for detecting division signals out of the received down link signal, in phase to the constant time intervals;
an adding device for adding the detected division signals over a predetermined time duration, which is longer than the constant time interval, with matching phases for each of the constant time intervals, so as to generate accumulated additional values; and
a memory device for storing the accumulated additional values generated by said adding device, to thereby perform synchronization capturing with the base station on the basis of the accumulated additional values added over the predetermined time duration and stored in said memory device,
wherein each of said constant time intervals is divided into a plurality of predetermined time intervals, and wherein said detecting device calculates a correlation between a signal correlated with the division signal and the received down link signal for each of the predetermined time intervals, and compares the calculated correlation with a predetermined threshold value for each of the predetermined time intervals, and detects the division signal out of the received down link signal when the calculated correlation calculated for each of the predetermined time intervals exceeds the predetermined threshold value.

2. A communicating apparatus according to claim 1, wherein said memory device has a plurality of memory areas to store the accumulated additional values with packing each of the accumulated additional values in respective one of the memory areas, when said adding device generates the accumulated additional values by adding at different timings within the constant time interval.

3. A communicating method of performing an asynchronous communication with a base station, comprising:

a receiving process of receiving a down link signal, which is transmitted from the base station and in which a division signal is inserted for each of constant time intervals;

a detecting process of detecting division signals out of the received down link signal, in phase to the constant time intervals;

an adding process of adding the detected division signals over a predetermined time duration, which is longer than the constant time interval, with matching phases for each of the constant time intervals, so as to generate accumulated additional values; and a storing process of storing the accumulated additional values generated by said adding process into a memory device, to thereby perform synchronization capturing with the base station on the basis of the accumulated additional values added over the predetermined time duration and stored in said memory device, wherein each of said constant time intervals is divided into a plurality of predetermined time intervals, and wherein said detecting process calculates a correlation between a signal correlated with the division signal and the received down link signal for each of the predetermined time intervals, and compares the calculated correlation with a predetermined threshold value for each of the predetermined time intervals, and detects the division signal out of the received down link signal when the calculated correlation calculated for each of the predetermined time intervals exceeds the predetermined threshold value.

4. A communicating method according to claim 3, wherein said memory device has a plurality of memory areas, and said storing process stores the accumulated additional values with packing each of the accumulated additional values in respective one of the memory areas, when said adding process generates the accumulated additional values by adding at different timings within the constant time interval.

* * * * *